USO10620318B2

United States Patent
Yi et al.

(10) Patent No.: US 10,620,318 B2
(45) Date of Patent: Apr. 14, 2020

(54) SINGLE-LINE-EXTRACTED PURE ROTATIONAL RAMAN LIDAR TO MEASURE ATMOSPHERIC TEMPERATURE AND AEROSOL PROFILES

(71) Applicant: Wuhan University, Wuhan (CN)

(72) Inventors: Fan Yi, Wuhan (CN); Miao Weng, Wuhan (CN); Fuchao Liu, Wuhan (CN); Yunpeng Zhang, Wuhan (CN); Changming Yu, Wuhan (CN); Yujin He, Wuhan (CN); Ying Tan, Wuhan (CN); Yang Yi, Wuhan (CN); Xiangliang Pan, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 271 days.

(21) Appl. No.: 15/600,780

(22) Filed: May 21, 2017

(65) Prior Publication Data

US 2018/0188376 A1 Jul. 5, 2018

(30) Foreign Application Priority Data

Jan. 3, 2017 (CN) .......................... 2017 1 0001666

(51) Int. Cl.
*G01C 3/08* (2006.01)
*G01S 17/95* (2006.01)
(Continued)

(52) U.S. Cl.
CPC .............. *G01S 17/95* (2013.01); *G01S 7/484* (2013.01); *G01S 7/4861* (2013.01); *Y02A 90/19* (2018.01)

(58) Field of Classification Search
None
See application file for complete search history.

(56) References Cited

U.S. PATENT DOCUMENTS 7,583,364 B1  9/2009 Mayor et al.

FOREIGN PATENT DOCUMENTS

CN   101718871 A   6/2010
CN   204731410 U   10/2015
(Continued)

OTHER PUBLICATIONS

Spaceborne profiling of atmospheric temperature and particle extinction with pure rotational Raman lidar and of relative humidity in combination with differential absorption lidar: performance simulations, Paolo Di Girolamo, Andreas Behrendt, and Volker Wulfmeyer, 2006 Optical Society of America, OCIS codes: 010.1.*
(Continued)

*Primary Examiner* — Isam A Alsomiri
*Assistant Examiner* — Amir J Askarian
(74) *Attorney, Agent, or Firm* — Matthias Scholl P.C.; Matthias Scholl

(57) ABSTRACT

A single-line-extracted pure rotational Raman lidar system, including: a transmitter unit configured to emit extremely narrow-band laser light that is guided into atmosphere zenithward; a receiver unit configured to collect backscattered signals from the atmosphere; and a data acquisition and control unit configured to deliver data and guarantee automatic operation of the lidar system orderly. The transmitter unit employs a powerful injection-seeded Nd: YAG laser to emit 532.23 nm laser beam with a pulse energy of approximately 800 mJ, a repetition rate of 30 Hz and linewidth of <0.006 cm$^{-1}$. The lidar system has an optical bandwidth of approximately 30 pm for the two Raman channels and an optical bandwidth of 0.3 nm for an elastic channel, as well as a field of view of approximately 0.4 mrad. The two Raman channels extract the $N_2$ anti-Stokes pure rotational Raman line signals with J=6 and 16, respectively.

5 Claims, 3 Drawing Sheets

(51) Int. Cl.
    *G01S 7/4861*     (2020.01)
    *G01S 7/484*     (2006.01)

(56) References Cited

FOREIGN PATENT DOCUMENTS

| CN | 105675576 A | | 6/2016 |
|---|---|---|---|
| CN | 106093915 B | * | 3/2019 |

OTHER PUBLICATIONS

Combined Raman lidar for the measurement of atmospheric temperature, water vapor, particle extinction coefficient, and particle backscatter coefficient, Andreas Behrendt, Takuji Nakamura, Michitaka Onishi, Rudolf Baumgart, and Toshitaka Tsuda, 2002 Optical Society of America, OCIS codes: 010.7030, 010.7340, 280.11.*

The GREGOR Fabry-P'erot Interferometer, K.G. Puschmann et al, 2012 WILEY-VCH Verlag GmbH&Co.KGaA, Weinheim.*

Fabry-P'erot based narrow band imager for solar filament observations, Sajal Kumar Dhara, Belur Ravindra and Ravinder Kumar Banyal, RAA 2016 vol. 16 No. 1, 10 (10pp) doi: 10.1088/1674-4527/16/1/010.*

M-660 PILine® Rotation Stage, Physik Instrumente (PI) GmbH & Co. KG 2011.* optical interference filters, Catalog 2012, www.omegafilters.com.*

S. Zhong et al., A new method for inversion of atmospheric temperature and aerosol backscatter coefficient using pure rotational Raman spectrum, Chinese Journal of Geophysics, Nov. 2012, pp. 3527-3533, vol. 55, No. 11, Chinese Geophysical Society and the Institute of Geology and Geophysics of the Chinese Academy of Sciences, China.

Yufeng Wang et al, Raman lidar for atmospheric temperature, humidity and aerosols up to troposphere height, Acta Optica Sinica, Mar. 2015, pp. 0328004-1 to 0328004-10, vol. 35, No. 3, Chinese Laser Press, Shanghai, China.

Guangyu Bo et al, Rayleigh-Raman-Mie Lidar for atmospheric temperature and aerosol profiles measurement, Acta Optica Sinica, Jan. 2010, pp. 19-25, vol. 30 , No. 1, Chinese Laser Press, Shanghai, China.

The ROCK seeder laser system, Rev.1, Sep. 2008, NP Photonics Inc., United States, [online], <URL: http://docs.wixstatic.com/ugd/6a397e_ca3aa6c1941e4e0ca71a8ba129d2b764.pdf?index=true>.

Laser, model No. Powerlite™ DLS 9030, Continuum, Amplitude Laser Group, United States, [online], <URL: https://amplitude-laser.com/wp-content/uploads/2019/01/Powerlite-DLS-9000.pdf>.

Electronically-adjustable mount, model No. SA07A-RL01, Kohzu Precision Co.,Ltd., Japan, [online], <URL: https://www.kohzuprecision.com/products/positioning-stages/swivel-tilt-stage/motorized-swivel-stage/product/76/5%2C20/SA07A-RL01/1292/>.

Telescope, model No. LX90 ACF™ Telescope—8" F/10, Meade Instruments Corp., United States, [online], <URL: https://www.meade.com/lx90-telescopes.html?cat=5>.

Iris, item No. SM1D12D, Thorlabs Inc., United States, [online], <URL: https://www.thorlabschina.cn/drawings/232888bf7b58ed2e-DA747E3B-C45F-14C7-0312AB62A392E116/SM1D12D-AutoCADPDF.pdf>.

Reflecting mirror, item No. BB2-E02, Thorlabs Inc., United States, [online], <URL: https://www.thorlabschina.cn/drawings/232888bf7b58ed2e-DA747E3B-C45F-14C7-0312AB62A392E116/BB2-E02-AutoCADPDF.pdf>.

Temperature controller, model No. 3504, Eurotherm Limited, United Kingdom, [online], <URL: https://www.eurotherm.com/products/temperature-controllers-us/multi-loop-temperature-controllers-us/3500-advanced-temperature-controller-and-programmer/>.

Photosensor module, model No. H6780-02, Hamamatsu Photonics K.K., Japan, [online], <URL: http://doc.chipfind.ru/hamamatsu/h678002.htm>.

Photosensor module, model No. H7422-40, Hamamatsu Photonics K.K., Japan, [online], <URL: https://www.hamamatsu.com/us/en/product/type/H7422-40/index.html>.

Beamsplitter, item title: 50mm 50R/50T Standard Cube Beamsplitter, Edmund Optics Inc., United States, [online], <URL: https://www.edmundoptics.com/p/50mm-50r50t-standard-cube-beamsplitter/2540/>.

Mount, model No. 7SRA2100A, Sofn Instruments Co., LTD, China, [online], <URL: http://www.7-s.com.cn/ProductShow_692.html>.

* cited by examiner

FIG. 1 (Relevant Art)

SINGLE-LINE-EXTRACTED PURE ROTATIONAL RAMAN LIDAR TO MEASURE ATMOSPHERIC TEMPERATURE AND AEROSOL PROFILES

CROSS-REFERENCE TO RELATED APPLICATIONS

Pursuant to 35 U.S.C. § 119 and the Paris Convention Treaty, this application claims the benefit of Chinese Patent Application No. 201710001666.2 filed Jan. 3, 2017, the contents of which are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The present disclosure of the invention belongs to the field of lidar remote sensing technique, and more particularly to simultaneous lidar measurements of atmospheric temperature and aerosol extinction and backscatter coefficients.

Description of the Related Art

Accurate and high-resolution measurements of atmospheric temperature are important for weather and climate monitoring. Vertical temperature profiles are acquired by routinely launched radiosondes (typically twice a day). Although such routine radiosonde temperature profiles have a high accuracy and good altitude resolution, their low time resolution makes it unlikely to register some fast weather processes.

A pure rotational Raman (PRR) lidar can overcome this drawback to obtain high time-resolution temperature profiles throughout the troposphere. The PRR lidar technique is based on a fact that under local thermodynamic equilibrium conditions, the signal intensity ratio R(T) of two individual PRR lines has a simple temperature dependence defined by the Boltzmann distribution. If only one PRR line is detected in each of the two PRR channels, the lidar equation for each channel can be written as:

$$N_{\lambda_J} = \frac{C_{\lambda_J}}{z^2} \cdot n(z) \sigma_{\lambda_J}(T) \cdot \exp\left[-\int_0^z (\alpha_{a,\lambda_0} + \alpha_{m,\lambda_0} + \alpha_{a,\lambda_J} + \alpha_{m,\lambda_J}) dz\right], \quad (1)$$

where $N_{\lambda_J}$ is the lidar-detected photon count at the Raman-shifted wavelength $\lambda_J$, J the rotational quantum number (J=$J_1$ or $J_2$), $C_{\lambda_J}$ the system constant, z the detection range, n the number density of air molecules, $\sigma_{\lambda_J}(T)$ the differential backscatter cross section, T the atmospheric temperature, $\lambda_0$ the incident laser wavelength, $\alpha$ the extinction coefficient with subscripts a and m referring to aerosol and molecule respectively. The signal intensity ratio R(T) of the two individual PRR lines has the following simple temperature dependence:

$$R(T) = \frac{N_{\lambda_{J_2}}}{N_{\lambda_{J_1}}} = \exp\left(A + \frac{B}{T}\right), \quad (2)$$

where A and B are constants. Based on the equation (2), the exact solution of temperature T can be obtained after A and B are determined via comparison with accompanying local radiosondes (B can be calculated also from the difference of the rotational energy levels at the quantum state $J_1$ and $J_2$). Equation (2) represents the basic principle for the atmospheric temperature measurement according to the PRR lidar technique. It is valid only when each of the two Raman channels of the PRR lidar extracts a single PRR line. But, because the spectral extraction devices (interference filter or grating polychromator) utilized in the existing PRR lidars have a limited bandwidth, each rotational Raman channel has to extract several adjacent PRR lines of both $N_2$ and $O_2$ molecules rather than a single one. Then the signal ratio R(T) becomes a complicated function of temperature T so that the rigorous solution of temperature T is unavailable. In this case, a calibration function with an argument of second-order polynomial of $$\frac{1}{T}$$

is introduced to approximately represent the temperature dependence of the signal ratio R(T). Although the simulations indicate that the calibration function can approaches well the theoretical result of the signal ratio R(T) for sampling two multiple-line portions of the PRR spectra, the approximate expression for the principle of the PRR temperature measurement induces a systematic error after all. In addition, the introduced calibration constants also lack a clear-cut connection with the result of the Raman scattering theory and lidar system parameters. Therefore, to ensure reliable temperature measurement, it is necessary to develop a single-line-extracted PRR lidar which makes the most basic principle of the PRR temperature measurement satisfied.

Furthermore, when an elastic channel is added to the single-line-extracted PRR lidar, the aerosol backscatter and extinction profiles can be determined strictly from one measured single PRR line signal and elastic backscatter signal without additional assumptions. It is well known that the data retrieval of the elastic lidar return suffers from the fact that two physical quantities (two unknowns), the aerosol particle backscatter coefficient and extinction coefficient, must be determined from only one measured quantity (one equation). Thus, additional assumptions have to be introduced to settle this problem. Fernald (1984) developed an algorithm to derive the two physical quantities by assuming that the ratio of aerosol extinction coefficient to backscatter coefficient (or lidar ratio) was a given constant value. This lidar ratio assumption is usually not true for the actual atmosphere. In the case of the aerosol extinction and backscatter coefficients to be retrieved from a vib-rotational $N_2$ Raman signal and elastic backscatter signal, an assumed wavelength dependence (the Ångström relationship) of the aerosol extinction coefficient must be introduced to obtain its result at the transmitted wavelength. The assumed Ångström relationship needs further verification. For the single-line-extracted PRR lidar with a setup of the two rotational Raman channels and the elastic channel, the combined two lidar equations for the elastic channel and one PRR channel can be strictly solved for the aerosol backscatter and extinction coefficients. It is expected that this kind of lidar can provide strict quantitative standards for the accurate lidar measurements of the two aerosol parameters as well as resultant lidar ratio (without additional assumptions).

For the purpose of digging up the extractible (isolatable) $N_2$ molecule PRR lines, we have calculated normalized PRR spectra for $N_2$ and $O_2$ molecules given a 532.23-nm laser emission at temperature of 300 K. It is found from the calculated PRR spectra that two pairs of the single $N_2$ molecule PRR lines are extractible respectively by a combination of the interference filter and Fabry-Perot interferometer. FIG. 1 shows that for the anti-Stokes PRR spectra, the two $N_2$ molecule PRR lines with J=6 and 16 have line spacing larger than 0.14 nm from adjacent $O_2$ molecule PRR lines (for the Stokes PRR spectra, the same line spacing feature can be seen for the two $N_2$ molecule PRR lines with J=4 and 14). In the light of the two $N_2$ molecule anti-Stokes PRR lines with J=6 and 16, each rotational Raman channel of our PRR lidar is designed by using a combination of interference filter and Fabry-Perot interferometer (FPI). The employed interference filters have a bandwidth of ~0.3 nm and a peak transmittance at the position of the extractible single PRR line (J=6 or 16), while each matched FPI has a bandwidth of approximately 30 pm and a central wavelength at the PRR line position (J=6 or 16). With such a spectral resolution, each of the two Raman channels in our PRR lidar can exactly register the backscattered signal according to a single PRR line (J=6 or 16) and sufficiently suppress adjacent $O_2$ molecule line signals as well as strong elastic signal. The ratio of the signal intensities from the two Raman channels has the simple exact temperature dependence described by equation (2). Then the distance-dependent atmospheric temperature can be derived exactly from equation (2) after the constant parameters A and B are determined via comparison with accompanying local radiosondes (i.e., calibration). Note that the constant B in equation (2) can also be figured out theoretically according to the difference of the rotational Raman energies for J=6 and 16. The consistency between the theoretical result and calibrated B value provides a test criterion for the validity of the single-line-extracted PRR lidar system.

The lidar equation for the elastic channel added to the single-line-extracted PRR lidar is written as:

$$N_{\lambda_0} = \frac{C_{\lambda_0}}{z^2} \cdot (\beta_a + \beta_m) \cdot \exp\left[-2\int_0^z (\alpha_{a,\lambda_0} + \alpha_{m,\lambda_0}) dz\right], \quad (3)$$

where $N_{\lambda_0}$ and $C_{\lambda_0}$ denote respectively the lidar-detected photon count and system constant with the subscript $\lambda_0$ standing for the wavelength of the elastic channel. $\beta_a$ and $\beta_m$ are volume backscatter coefficients respectively for aerosol particles (subscript a) and air molecules (subscript m). In equation (3), $\beta_m$ and $\alpha_m$, as known quantities, can be calculated from local radiosonde data, while $\beta_a$ and $\alpha_a$ are two unknowns to be determined. Given the fact that the atmospheric transmission is nearly constant within the PRR spectra (the wavelength difference between the two extracted line signals and the elastic signal is less than 4.0 nm), combining equations (1) and (3) yields an expression of the particle backscatter coefficient at range z:

$$\beta_a(z) = \beta_m(z) \cdot \frac{T(z_0)\exp\left[-\frac{B_0 hc}{kT(z)}J(J+1)\right]}{T(z)\exp\left[-\frac{B_0 hc}{kT(z_0)}J(J+1)\right]} \cdot \frac{N_{\lambda_0}(z)N_{\lambda_J}(z_0)}{N_{\lambda_0}(z_0)N_{\lambda_J}(z)} - \beta_m(z). \quad (4)$$

Here, $z_0$ is a reference height where the particle backscatter coefficient is negligible [$\beta_a(z_0)=0$] compared to the known molecular backscatter value, T(z) the atmospheric temperature retrieved antecedently from equation (2). $B_0=1.98957$ cm$^{-1}$ is the rotational constant for $N_2$ molecule, h Planck's constant, c the velocity of light, k the Boltzmann constant and J the rotational quantum number (J=6). Equation (4) provides so far a uniquely exact solution to the particle backscatter coefficient in the case that no additional assumptions are introduced. Inserting equation (4) into equation (3), we obtain the aerosol extinction coefficient as follows:

$$\alpha_a(z) = \frac{1}{2} \cdot \frac{d}{dz}\left[\ln\frac{\beta_a(z) + \beta_m(z)}{N_{\lambda_0}(z) \cdot z^2}\right] - \alpha_m(z). \quad (5)$$

Equation (5) presents also a strict expression of the aerosol extinction coefficient without additional assumptions. Since each Raman channel (with FPI) of the single-line-extracted PRR lidar has a bandwidth of approximately 30 pm, all-day profiles of the atmospheric temperature and aerosol backscatter and extinction coefficients are naturally obtained.

SUMMARY OF THE INVENTION

The present disclosure of the invention proposes a single-line-extracted PRR lidar which enables all-day profiles of the atmospheric temperature and aerosol backscatter and extinction coefficients to be exactly obtained. The lidar system comprises a transmitter unit, a receiver unit and a data acquisition and control unit. The transmitter unit utilizes a doubled injection-seeded Nd: YAG laser to yield a narrow-band laser beam at 532.23 nm. At the receiver unit, the backscattered photons are first collected by a telescope that is followed by a field-stop iris and a collimating lens. A self-designed three-channel polychromator (interference filter plus Fabry-Perot interferometer) is used to respectively extract the two isolated $N_2$ molecule PRR line signals (anti-Stokes, J=6 and 16) as well as the elastic backscatter signal. The photomultiplier tube (PMT) at the end of each channel is utilized to change the light signal into electric signal. The signal at each channel is acquired by a PC-controlled transient digitizer at the data acquisition and control unit.

In order to achieve the accurate and all-day temperature and aerosol measurements, the currently-invented PRR lidar adopts the following technical scheme:

The transmitter employs a Nd: YAG laser to yield a 532.23-nm laser beam of approximately 800 mJ per pulse with a repetition rate of 30 Hz and linewidth of <0.006 cm$^{-1}$. At the receiver unit, the two Raman channels of the self-designed polychromator use a combination of the interference filter and Fabry-Perot interferometer (FPI) to respectively extract the two anti-Stokes PRR line signals from the $N_2$ molecules with J=6 and 16. Each Raman channel has a high suppression of the elastic backscatter signal (>8 orders of magnitude) and an adequate suppression of the adjacent $O_2$ line signals (>1.5 orders of magnitude). The optical bandwidths are respectively approximately 30 pm for the two Raman channels and 0.3 nm for the elastic channel, while the lidar field of view (FOV) is approximately 0.4 mrad. These system parameters enable the all-day measurements of the atmospheric temperature and aerosol backscatter and extinction coefficients.

The transmitter unit comprises an injection-seeded Nd:YAG laser, an 8× beam expander and a first reflecting mirror (RM1). The 8× beam expander is used to reduce the radiant flux density and divergence of the output laser beam. The expanded laser beam is guided into the atmosphere zenithward by an electronically-steerable first reflecting mirror (RM1).

The receiver unit comprises a telescope, an iris, a second reflecting mirror (RM2), a collimator, a first beam splitter (BS1), a third narrow-band interference filter (IF3), a third lens (L3), a third detector (detector 3), a second beam splitter (BS2), two second narrow-band interference filters (IF2), a Second Fabry-Perot interferometer (FPI2), a second lens (L2), a detector (second detector 2), two first narrow-band interference filters (IF1), a First Fabry-Perot interferometer (FPI1), a first lens (L1) and a first detector (detector 1). The telescope collects backscattered light signals from atmospheric molecules and aerosol particles. After the iris, the collected signal light is guided by the RM2 and becomes parallel by the collimator. The iris is located on the focal plane of the telescope. Its diameter is set to 0.8 mm to yield a system FOV of approximately 0.4 mrad. The incident collimated light beam is divided into two parts by the BS1: one part (10%) is reflected onto the IF3, then focused by the L3 and detected by the detector 3, while another (approximately 90%) is transmitted onto the BS2. The BS2 reflects and transmits the incoming collimated light with a reflectivity to transmittance (R-to-T) ratio of 1:1. The reflected light passes through the IF2 and FPI2, and then is focused by the L2 and detected by the second detector 2. The transmitted light goes through the IF1 and FPI1, and then is focused by the L1 and detected by the detector 1.

The beam splitter BS1 has a working angle of 45°. The BS2 is a non-polarizing cube beam splitter. The interference filter IF3 (50-mm aperture) has a bandwidth of 0.3 nm and a peak transmission of ~50% at center wavelength of 532.23 nm, providing a rejection ratio of >3 orders of magnitude to signals out of band. The IF2 (50-mm aperture) is of a bandwidth of 0.3 nm and a peak transmission of ~50% at center wavelength of 531.00 nm, providing a rejection ratio of >3 orders of magnitude to signals out of band. The technical parameters of the IF1 are similar to that of the IF2 except a center wavelength of 528.77 nm. Both the FPI2 and FPI1 have an aperture of 50 mm, an air spacing of 0.189 mm, cavity surface reflectivity of approximately 90%, fineness of 23 and free spectral range (FSR) of approximately 0.75 nm. The temperature and working angle of the FPI2 are finely controlled to extract the 531.00 nm signal (corresponding to the $N_2$ molecule J=6 line) with a peak transmission of 30% and a bandwidth of approximately 30 pm. It can generate a rejection ratio of >2 orders of magnitude to the elastic signal around 532.23 nm, as well as a rejection ratio of >1.5 orders of magnitude to the 531.18 nm signal (corresponding to the $O_2$ molecule J=7 line) and to the 530.85 nm signal (corresponding to the $O_2$ molecule J=9 line). The temperature and working angle of the FPI1 are accurately controlled to extract the 528.77 nm signal (corresponding to the $N_2$ molecule J=16 line) with a peak transmission of 30% and a bandwidth of approximately 30 pm. The FPI1 can yield a suppression ratio of >2 orders of magnitude to the elastic signal around 532.23 nm, as well as a suppression ratio of >1.5 orders of magnitude to the 528.91 nm signal (corresponding to the $O_2$ molecule J=21 line) and to the 528.60 nm signal (corresponding to the $O_2$ molecule J=23 line). The detector 3 (PMT) registers the approximately 532.23 nm elastic return, while the second detector 2 and the detector 3 record respectively the signals of the $N_2$ molecule anti-Stokes PRR lines for J=6 and 16.

The data acquisition and control unit comprises a computer that stores the acquired data and controls the operation of the entire lidar system orderly. With a self-developed software, the computer controls a three-channel transient recorder to acquire data from the three detectors. The transient recorder works in both analog (AD) mode and photon counting (PC) mode to record the original signals. The recorded data are then transferred to the computer through an Ethernet cable and saved.

The present disclosure of the invention has the following advantages and positive effects:

Each of the two Raman channels in our PRR lidar can exactly register the backscatter signal according to a single PRR line (J=6 or 16) and sufficiently suppress adjacent $O_2$ molecule line signal as well as strong elastic signal. This allows the simple exact temperature dependence described by equation (2) to be applied in the temperature profile retrieval without introducing an assumed calibration function. The atmospheric temperature profile can be derived exactly from equation (2) after the constant parameters A and B are determined via comparison with accompanying local radiosondes (i.e., calibration). The constant B in equation (2) can also be figured out theoretically according to the difference of the rotational Raman energies for J=6 and 16. The consistency between the theoretical result and calibrated B value provides a test criterion for the validity of the single-line-extracted PRR lidar system. The aerosol backscatter and extinction profiles can be further determined strictly from one measured PRR line signal and elastic backscatter signal without additional assumptions (e.g. lidar ratio or Ångström relationship). The two obtained aerosol parameters as well as resultant lidar ratio can provide quantitatively strict standards for lidar measurements of aerosols. Since the invented lidar system has a small FOV (approximately 0.4 mrad) and extremely narrow optical bandwidth for the three receiver channels (elastic channel, 0.3 nm; two Raman channels, approximately 30 pm), as well as a high transmitter power (a pulse energy of approximately 800 mJ and pulse repetition rate of 30 Hz), it enables all-day temperature and aerosol profiles to be exactly obtained.

Each of the two Raman channels employs two identical narrowband interference filters and a FPI. The central wavelengths of the two FPIs are 531.00 nm and 528.77 nm, respectively matching the two anti-Stokes PRR lines with J=6 and 16 for the $N_2$ molecules. The filters plus the FPI in each Raman channel also produce a high suppression (>8 orders of magnitude) to the elastic signal around 532.23 nm and an adequate suppression (>1.5 orders of magnitude) to adjacent $O_2$ PRR line signals. The two PRR lines are thus extracted effectively. The ratio of the extracted two Raman line signals satisfies the simple exact temperature dependence described by equation (2). This allows exact temperature retrieval according to the most basic principle of the PRR temperature lidar.

Given the fact that the atmospheric transmission is nearly constant within the PRR spectra (at the elastic Cabannes line and the two extracted PRR lines), the aerosol backscatter and extinction profiles can be further determined strictly from one measured PRR line signal and elastic backscatter signal without additional assumptions (e.g. lidar ratio or Ångström relationship). The resulting aerosol backscatter and extinction coefficients represent quantitatively strict standards for the lidar measurements of aerosol so far.

DETAILED DESCRIPTION OF THE EMBODIMENTS

Figure 1:
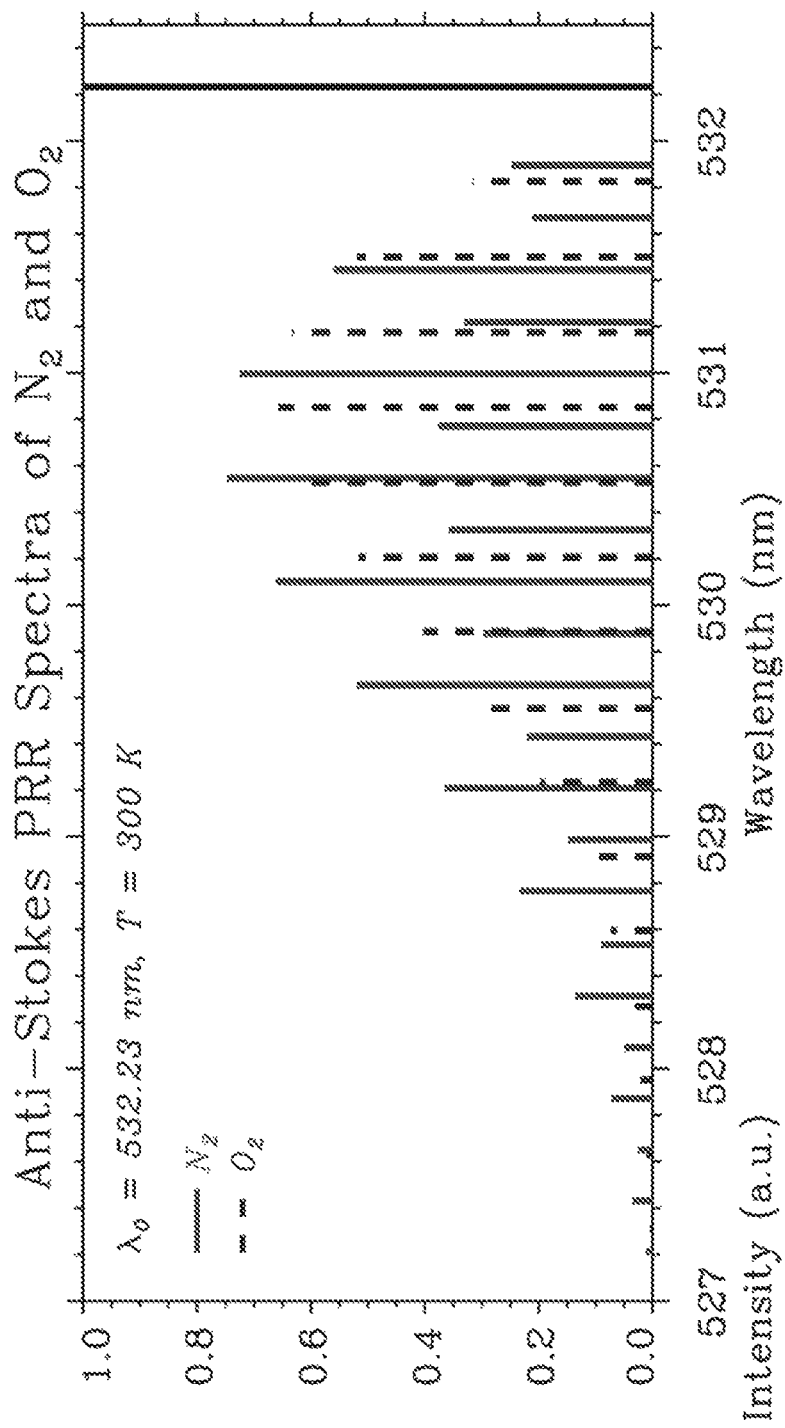
FIG. 1 displays an anti-Stokes pure rotational Raman spectra of $N_2$ and $O_2$ molecules.
Figure 2:
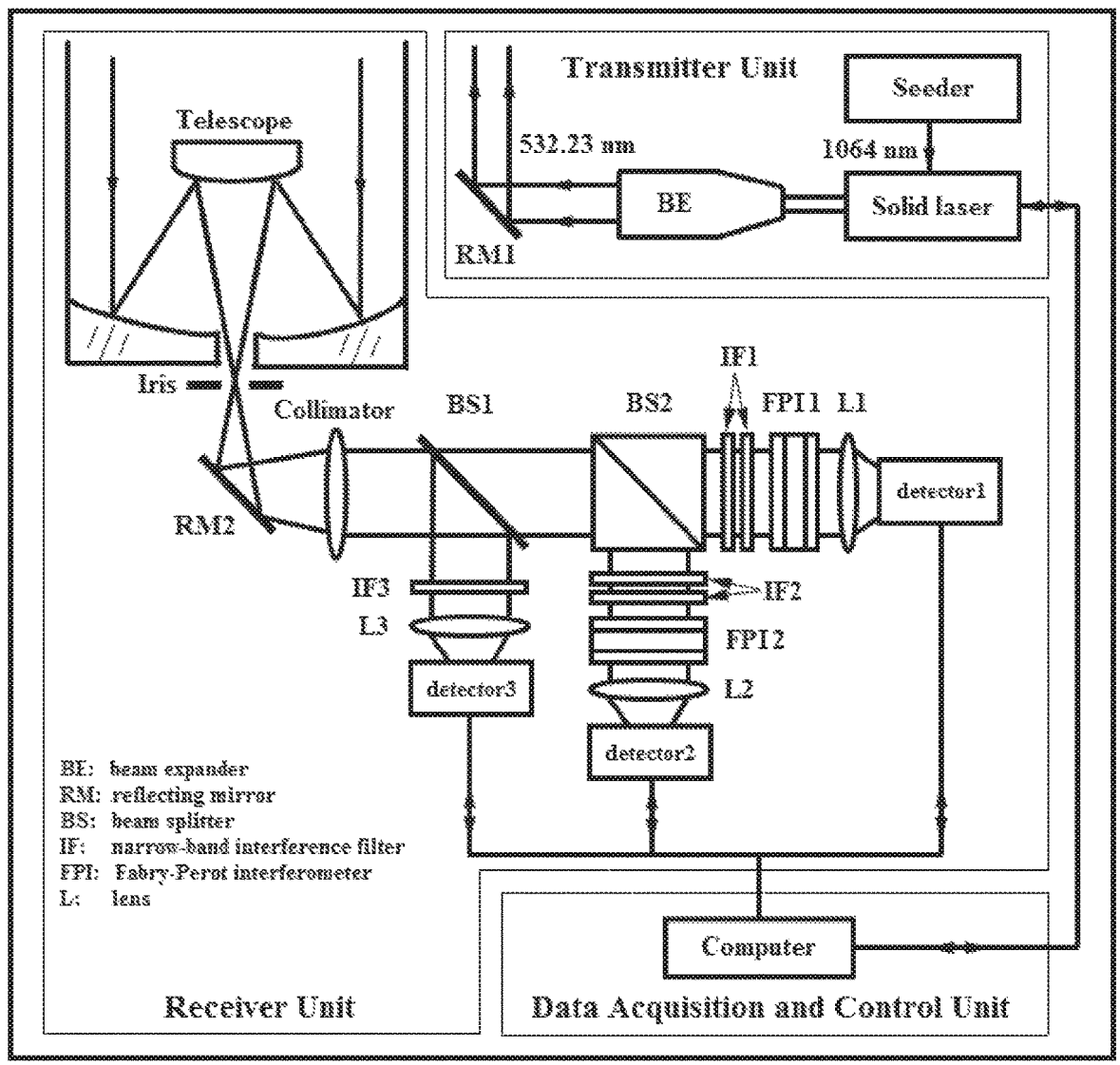
FIG. 2 shows a schematic layout of a lidar system in accordance with one embodiment of the invention.
Figure 3:
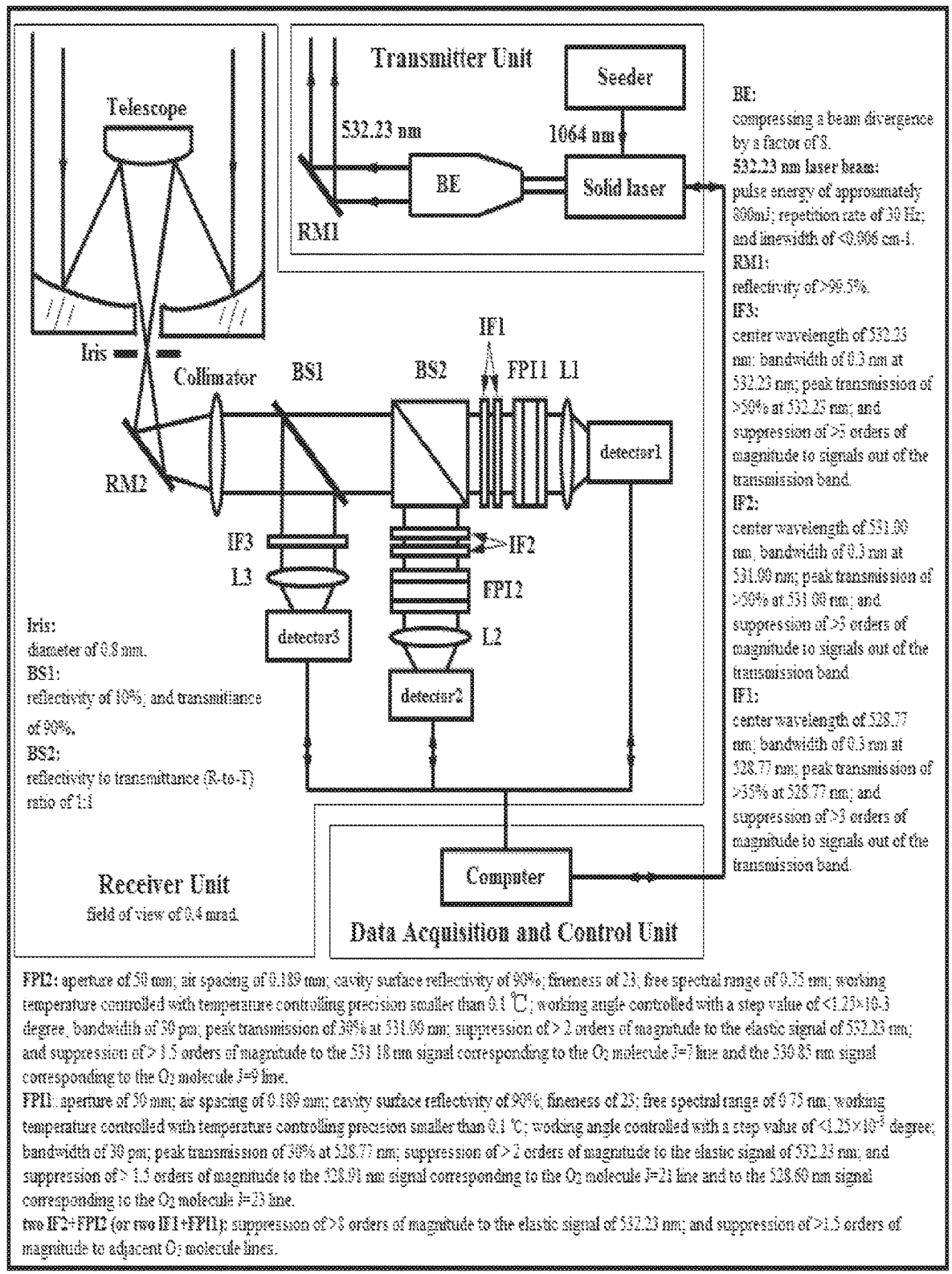
FIG. 3 shows the specifications of the components in a lidar system in accordance with one embodiment of the invention.

The invented lidar system comprises a transmitter unit, a receiver unit, and a data acquisition and control unit. FIG. 2 presents its schematic layout.

The transmitter unit comprises a seeder, a solid Nd: YAG laser, a beam expander (BE) and a first reflecting mirror (RM1). The seeder (NP Photonics Inc., US) generates an extremely narrow-band infrared 1064 nm fundamental laser light. The 1064-nm light is guided into the resonant cavity of the solid laser by an optical fiber. The solid laser (Powerlite 9030, Continuum, US) emits a 532.23-nm laser beam with a pulse energy of approximately 800 mJ, repetition rate of 30 Hz and linewidth of <0.006 cm$^{-1}$ (via a frequency doubling crystal). A home-made BE compresses the beam divergence by a factor of 8 and also reduces the radiant flux density of the output laser beam. The expanded laser beam is guided into atmosphere zenithward by the RM1 (reflectivity >99.5%) that is put on a two-dimensional electronically-adjustable mount (Kohzu, JP).

The receiver unit comprises a telescope, an iris, a second reflecting mirror (RM2), a collimator, a first beam splitter (BS1), a third narrow-band interference filter (IF3), a third lens (L3), a third detector (detector 3), a non-polarizing cube beamsplitter (BS2), subassembly for the channel 2 (double narrow-band interference filters (IF2), a second Fabry-Perot interferometer (FPI2), a second lens (L2), and a detector (detector 2), subassembly for the channel 1 (double first narrow-band interference filters (IF1), a first Fabry-Perot interferometer (FPI1), a first lens (L1) and a first detector (detector 1). The backscattered light is collected by the telescope and focused on the iris. The telescope (Cassegrain type, Meade, US) has an aperture of 203.2 mm and a focal length of 2032 mm. The iris (Thorlabs, US) on the focal plane of the telescope has a diameter of 0.8 mm to give rise to a receiver FOV of approximately 0.4 mrad. The light exiting the iris is redirected by the RM2 and then converted to a collimated light by the collimator. The RM2 (Thorlabs, US) works at an angle of 45° and has a reflectivity of >99% in the 400-750 nm range. The collimator (Edmund, US) is of a focal length of 486.3 nm and an aperture of 60 mm. The BS1 separates the collimated light beam into two parts in terms of intensity: 10% of the signal light is reflected to enter the IF3 and then focused onto the detector 3 by the L3, while ~90% of the signal light is transmitted to enter the BS2. The BS2 separates the incoming collimated light into two parts with an R-to-T ratio of 1:1. The reflected light passes through the IF2 and FPI2, then is focused onto the second detector (detector 2) by the second lens (L2), while the transmitted light goes through the IF1 and FPI1, then is focused onto the detector 1 by the first lens (L1).

The BS1 (Sigma, JP) is customized with a working angle of 45° and a size of 76 mm (length)×50 mm (width)×3 mm (thickness). The BS2 (Edmund, US) is a non-polarizing cube beamspiltter with a side length of 50 mm. The IF3, IF2s and IF1s are all customized with the same aperture of 50 mm. The IF3 (Andover, US) has a bandwidth of 0.3 nm and a peak transmission of >50% at the wavelength of 532.23 nm, as well as a suppression of >3 orders of magnitude to signals out of band. The IF2 (Ban, US) has a bandwidth of 0.3 nm and a peak transmission of >50% at 531.00 nm, as well as a suppression of >3 orders of magnitude to signals out of band (including the elastic return around 532.23 nm). The IF1 (Ban, US) has a bandwidth of 0.3 nm and a peak transmission of >35% at 528.77 nm, as well as a suppression of >3 orders of magnitude to signals out of band (including the elastic return around 532.23 nm). Both the FPI2 and FPI1 are customized (Tec Optics, US) with an aperture of 50 mm, an air spacing of 0.189 mm, a cavity surface reflectivity of approximately 90%, as well as a fineness of 23 and a free spectral range (FSR) of approximately 0.75 nm. The working temperature for each of the FPI2 and FPI1 is controlled by a temperature controller (Euroherm, UK) with a temperature controlling precision better than 0.1° C. The working angle for each of the FPI2 and FPI1 is controlled by an electronically-adjustable rotary mount (BJSFGD, CN) with a step value of <1.25×10$^{-3}$ degree. Accordingly, the second Fabry-Perot interferometer has a bandwidth of approximately 30 pm, a peak transmission of 30% at 531.00 nm and a suppression of >2 orders of magnitude to the elastic signal around 532.23 nm, as well as a suppression of >1.5 orders of magnitude to both the 531.18 nm signal (corresponding to the $O_2$ molecule J=7 line) and the 530.85 nm signal (corresponding to the $O_2$ molecule J=9 line), while the FP1 has a bandwidth of approximately 30 pm, a peak transmission of 30% at 528.77 nm, a suppression of >2 orders of magnitude to the elastic signal around 532.23 nm, as well as a suppression of >1.5 orders of magnitude to the 528.91 nm signal (corresponding to the $O_2$ molecule J=21 line) and to the 528.60 nm signal (corresponding to the $O_2$ molecule J=23 line). The detector 3 (PMT, H6780, Hamamatsu, JP) records the elastic signal around 532.23 nm with a quantum efficiency of approximately 20%. The second detector 2 (PMT, H7422, Hamamatsu, JP) detects the $N_2$ molecule anti-Stokes PRR line J=6 signal (531.00 nm) with a quantum efficiency of approximately 40%. The detector 1 (PMT, H7422, Hamamatsu, JP) detects the $N_2$ molecule anti-Stokes PRR line J=16 signal (528.77 nm) with a quantum efficiency of approximately 40%.

The data acquisition and control unit comprises a computer. A self-developed software is utilized to control a three-channel Licel transient recorder (Licel, DE) to acquire data from the three detectors. A home-made time-sequence circuit guarantees the automatic operation of the whole lidar system orderly. The Licel transient recorder works both in analog (AD) mode and photo counting (PC) mode simultaneously to record the signals from the detectors. The recorded data are then transferred to the computer through an Ethernet cable and saved.

The invention claimed is:

1. A single-line-extracted pure rotational Raman lidar system, comprising:
  a transmitter unit, comprising an injection-seeded Nd: YAG laser to emit a laser beam that is guided into atmosphere zenithward;
  a receiver unit, being configured to collect backscatter signals from molecules and aerosols in the atmosphere; the receiver unit comprising an elastic channel, a first Raman channel, and a second Raman channel; the first Raman channel comprising two first interference filters and a first Fabry-Perot interferometer; the second Raman channel comprising two second interference filters and a second Fabry-Perot interferometer; and the elastic channel comprising a third interference filter; and a data acquisition and control unit, being configured to deliver data and guarantee automatic operation of the lidar system;

wherein:

the injection-seeded Nd: YAG laser is adapted to emit a 532.23 nm laser beam with a pulse energy of 800 mJ, a repetition rate of 30 Hz and linewidth of <0.006 cm$^{-1}$;

the first Raman channel is disposed downstream the second Raman channel, and the second Raman channel is disposed downstream the elastic channel;

the first Fabry-Perot interferometer is disposed downstream the two first interference filters, and the second Fabry-Perot interferometer is disposed downstream the two second interference filters;

the third interference filter has a center wavelength of 532.23 nm, and has a bandwidth of 0.3 nm at the center wavelength of 532.23 nm;

each of the two second interference filters has a center wavelength of 531.00 nm, and has a bandwidth of 0.3 nm at the center wavelength of 531.00 nm;

each of the two first interference filters has a center wavelength of 528.77 nm, and has a bandwidth of 0.3 nm at the center wavelength of 528.77 nm;

each of the first and second Fabry-Perot interferometers has a bandwidth of 30 μm;

the elastic channel is adapted to extract an elastic signal of 532.23 nm;

the second Raman channel is adapted to extract a signal having a single anti-Stokes pure rotational Raman line from $N_2$ molecules with J=6, and the first Raman channel is adapted to extract a signal having a single anti-Stokes pure rotational Raman line from $N_2$ molecules with J=16; and each of the first and second Raman channels provides a suppression of >8 orders of magnitude to the elastic signal of 532.23 nm, as well as a suppression of >1.5 orders of magnitude to adjacent $O_2$ molecule lines; and the receiver unit has a field of view of 0.4 mrad.

2. The system of claim 1, wherein the transmitter unit comprises a seeder, an optical fiber, the injection-seeded Nd: YAG laser, a beam expander, and a first reflecting mirror; the seeder is adapted to generate an infrared 1064 nm fundamental laser light; the optical fiber is adapted to guide the 1064 nm light into the injection-seeded Nd: YAG laser; the beam expander is adapted to compress a beam divergence by a factor of 8 and reduce a radiant flux density of the laser beam from the injection-seeded Nd: YAG laser to yield an expanded laser beam; the first reflecting mirror is adapted to reflect the expanded laser beam into atmosphere zenithward with a reflectivity of >99.5%.

3. The system of claim 2, wherein:

the receiver unit comprises a telescope, an iris, a second reflecting mirror, a collimator, a first beam splitter, the third interference filter, a third lens, a third detector, a second beam splitter, the two second interference filters, the second Fabry-Perot interferometer, a second lens, a second detector, the two first interference filters, the first Fabry-Perot interferometer, a first lens, and a first detector;

the telescope is adapted to transmit the backscatter signals through the iris to the second reflecting mirror, the second reflecting mirror is adapted to reflect the backscatter signals to the collimator; and the collimator is adapted to collimate the backscatter signals to yield a collimated light beam;

the iris is located on a focal plane of the telescope, and a diameter of the iris is 0.8 mm;

the first beam splitter is adapted to reflect the collimated light beam with a reflectivity of 10% onto the third interference filter, and transmit the collimated light beam with a transmittance of 90% onto the second beam splitter;

the third lens is adapted to focus a beam from the third interference filter, and the third detector is adapted to detect a beam from the third lens;

the second beam splitter is adapted to reflect and transmit an incoming collimated light beam with a reflectivity to transmittance (R-to-T) ratio of 1:1;

the two second interference filters and the second Fabry-Perot interferometer are adapted to extract the signal having the single anti-Stokes pure rotational Raman line from $N_2$ molecules with J=6 from a reflected light beam from the second beam splitter;

the two first interference filters and the first Fabry-Perot interferometer are adapted to extract the signal having the single anti-Stokes pure rotational Raman line from $N_2$ molecules with J=16 from a transmitted light beam from the second beam splitter;

the second lens is adapted to focus the signal having the single anti-Stokes pure rotational Raman line from $N_2$ molecules with J=6, and the second detector is adapted to detect the signal having the single anti-Stokes pure rotational Raman line from $N_2$ molecules with J=6; and the first lens is adapted to focus the signal having the single anti-Stokes pure rotational Raman line from $N_2$ molecules with J=16, and the first detector is adapted to detect the signal having the single anti-Stokes pure rotational Raman line from $N_2$ molecules with J=16.

4. The system of claim 3, wherein the data acquisition and control unit comprises a computer that stores acquired data and controls the operation of the lidar system.

5. The system of claim 4, wherein:

the third interference filter has a peak transmission of >50% at the center wavelength of 532.23 nm, as well as a suppression of >3 orders of magnitude to signals out of a transmission band of the third interference filter;

the second interference filter has a peak transmission of >50% at the center wavelength of 531.00 nm, as well as a suppression of >3 orders of magnitude to signals including the elastic signal of 532.23 nm that are out of a transmission band of the second interference filter;

the first interference filter has a bandwidth of 0.3 nm and a peak transmission of >35% at the center wavelength of 528.77 nm, as well as a suppression of >3 orders of magnitude to signals including the elastic signal of 532.23 nm that are out of a transmission band of the first interference filter;

both the first and second Fabry-Perot interferometers have an aperture of 50 mm, an air spacing of 0.189 mm, a cavity surface reflectivity of 90%, a fineness of 23 and free a free spectral range of 0.75 nm;

a working temperature for each of the first and second Fabry-Perot interferometers is controlled with a temperature controlling precision of smaller than 0.1° C.;

a working angle for each of the first and second Fabry-Perot interferometers is controlled with a step value of <1.25×10$^{-3}$ degree;

the second Fabry-Perot interferometer has a peak transmission of 30% at the center wavelength of 531.00 nm and a suppression of >2 orders of magnitude to the elastic signal of 532.23 nm, as well as a suppression of >1.5 orders of magnitude to both a 531.18 nm signal corresponding to the $O_2$ molecule J=7 line and a 530.85 nm signal corresponding to the $O_2$ molecule J=9 line, while and the first Fabry-Perot interferometer has a peak transmission of 30% at the center wavelength of 528.77 nm, a suppression of >2 orders of magnitude to the elastic signal of 532.23 nm, as well as a suppression of >1.5 orders of magnitude to a 528.91 nm signal corresponding to the $O_2$ molecule J=21 line and to a 528.60 nm signal corresponding to the $O_2$ molecule J=23 line; and the third detector is adapted to register the elastic signal of 532.23 nm, and the second detector and the third detector are adapted to register the signal having the single anti-Stokes pure rotational Raman line from $N_2$ molecules with J=6 and the signal having the single anti-Stokes pure rotational Raman line from $N_2$ molecules with J=16, respectively.

* * * * *